Patented Mar. 30, 1954

2,673,869

UNITED STATES PATENT OFFICE 2,673,869

LEAD REMOVAL FROM SOLUTION OF ALKYL MERCURY SALT AND ALKYL LEAD SALT

Albert L. Flenner, Wilmington, Del., assignor to E. I. du Pont de Nemours and Company, Wilmington, Del., a corporation of Delaware No Drawing. Application November 4, 1952, Serial No. 318,731

3 Claims. (Cl. 260—431)

This invention relates to methods for removing lead salt contaminants from alkyl mercury salts; and more particularly from alkyl mercury salts obtained by the reaction of a tetraalkyl lead with a mercury salt such as mercuric phosphate or mercuric acetate.

Alkyl mercury salts are effective fungicidal and bactericidal agents and have found use especially for the treatment of seeds and lumber. The use of such materials as ethyl and other lower alkyl mercury chlorides, bromides, sulfates, acetates, and the like for this purpose are shown for instance in U. S. Patents 1,770,886 and 1,770,887. It has been suggested by U. S. Patent 1,987,685 to make such compounds by reaction of a tetraalkyl lead such as tetramethyl or tetraethyl lead with a mercury salt such as mercuric chloride, mercuric acetate and similar salts. The reaction is illustrated by the following equation which is directed specifically to the preparation of the fungicidally active compound ethyl mercury acetate.

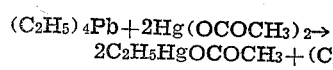

The reaction mixture of the above equation and like reactions of tetraalkyl leads with mercuric salts is soluble in water and can be used as a fungicide or bactericide without further treatment if the presence of the lead compound is not objectionable. However a precipitate of the lead compound will slowly form on standing and thus limits the value of such mixtures for liquid application.

I have now found a method for treatment of the reaction mixtures to remove the lead contaminant simply and effectively and thus provide improved liquid mercurial disinfectant compositions of greater stability and wider utility.

According to the processes of this invention, lead is removed from an aqueous solution of an alkyl mercury salt and an alkyl lead salt by mixing such an aqueous solution with a water soluble carbonate at pH 8 to 10. I have found that under these conditions notwithstanding the presence of a mercury compound that a lead containing precipitate forms and can be readily separated as by filtration to leave a clear aqueous solution of the desired alkyl mercury salt.

Examples follow to illustrate the invention.

Example 1

22.1 parts by weight of mercuric acetate was moistened with 0.1 part by weight of acetic acid and 1.5 parts by weight of ethanol. 11.2 parts by weight of tetraethyl lead was then added to the moistened mercuric acetate slowly over a period of 15 minutes while stirring constantly. The reaction was vigorous but not violent. The temperature rose from 27° C. to 60° C. and the reaction mixture became fluent.

The reaction mixture was stirred for 15 minutes after completing addition of the tetraethyl lead. On cooling to room temperature, the mass became solid. 66.72 parts by weight of water was then added and the mixture was warmed until all the material was in solution. An almost clear solution was obtained. This solution was then divided into two equal portions, A and B.

To solution A, 150 parts by weight of water was added, then solid sodium carbonate was added slowly. A precipitate formed and addition of sodium carbonate was continued until precipitation ceased. A total of 2.5 parts by weight of sodium carbonate was required. The mixture was filtered and there was thus obtained a clear solution of ethyl mercury acetate which remained clear on standing exposed to air. The solution contained 4.92% ethyl mercury acetate. The precipitate removed by filtration weighed after drying 5.35 parts by weight.

To solution B, 150 parts by weight of ethanol was added instead of water as had been done with solution A and then sodium carbonate was added to complete precipitation. The mixture was filtered, there was obtained a clear solution containing 4.96% ethyl mercury acetate. The precipitate after drying weighed 5.55 parts.

As illustrated by treatment of solution B above, the lead precipitation processes of the invention can be carried out in aqueous solutions in the presence of an organic liquid if desired.

In place of the sodium carbonate used in Example 1, it will be understood that various other carbonates such as ammonium carbonate, sodium bicarbonate, potassium carbonate, potassium bicarbonate and similar water soluble carbonates can be used. Using the more basic materials such as sodium carbonate, the pH is rapidly adjusted to the desired range of pH 8 to 10 by simple addition of the carbonate and addition of sodium hydroxide or other strong alkali to adjust pH is not necessary. The carbonate employed in the processes of the invention can be formed in situ by addition of carbon dioxide to a solution which has been adjusted to pH 8 to 10 by addition of an alkali as illustrated by the following example.

Example 2

Tetraethyl lead was reacted with mercuric acetate in aqueous solution to give a solution containing 29.5% by weight ethyl mercury acetate. 20 parts by weight of this solution was diluted by addition of 98 parts by weight of water and 118 parts by weight of ethanol to give a solution containing 2.5% ethyl mercury acetate.

Sodium hydroxide was added to the dilute solution to adjust it to pH 10. Gaseous carbon dioxide was then bubbled into the solution until formation of a white precipitate was complete. The precipitate was removed by filtration. The filtrate was a clear substantially lead free solution containing 2.35% ethyl mercury acetate.

While the invention has been illustrated in the example above with particular reference to the preparation of ethyl mercury acetate compositions, it will be understood that the lead removal process is equally applicable to the preparation of other alkyl mercury salts prepared by the reaction of tetraalkyl lead with mercuric salts according to prior art teachings. It is well suited, for example, for removal of lead from ethyl mercury phosphate compositions obtained by the reaction of tetraethyl lead with mercuric phosphate; and similarly, for treatment of other water soluble lower alkyl mercury salts such as the methyl, ethyl, n-propyl, and isopropyl mercury acetates and phosphates.

The processes of the invention are conveniently carried out at room or ambient temperatures as in the examples above. Temperature is not critical, however, and can be varied widely within practical limits.

I claim:
1. A process for removing lead from an aqueous solution of an alkyl mercury salt and an alkyl lead salt comprising mixing said solution with a water soluble carbonate at pH 8 to 10 whereby a lead containing precipitate forms and separating said precipitate.

2. A process for removing lead from an aqueous solution of an ethyl mercury salt and a diethyl lead salt, said salts being selected from the group consisting of acetates and phosphates comprising mixing said aqueous solution with a water soluble carbonate at pH 8 to 10 whereby a lead containing precipitate forms and separating said precipitate.

3. A process for the preparation of an aqueous solution of ethyl mercury acetate comprising reacting tetraethyl lead with mercuric acetate to form a mixture of ethyl mercury acetate and diethyl lead acetate, adding sodium carbonate to an aqueous solution of said mixture at pH 8 to 10 to precipitate a lead containing compound and separating said precipitate.

ALBERT L. FLENNER.

References Cited in the file of this patent
UNITED STATES PATENTS

| Number | Name | Date |
|---|---|---|
| 1,987,685 | Kharash | Jan. 15, 1935 |
| 2,344,874 | Holt | Mar. 21, 1944 |

OTHER REFERENCES

Chem. Ab., vol. 29, pages 2993–3994.
Ainley et al., J. Chem. Soc. (London) 1946. Pages 776–777.